W. WOOLSEY, Jr.
STEERING MECHANISM FOR BABY CARRIAGES.
APPLICATION FILED APR. 25, 1917.
1,258,971.
Patented Mar. 12, 1918.
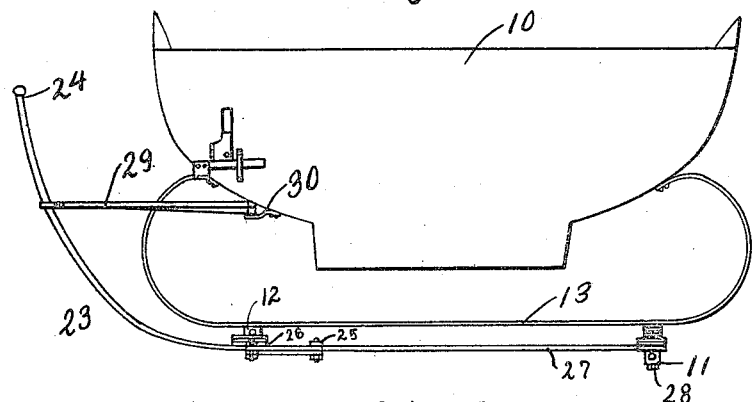
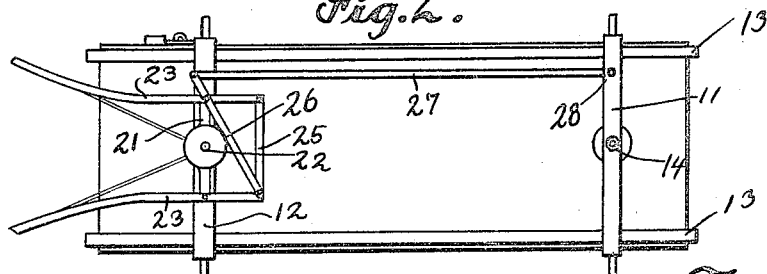
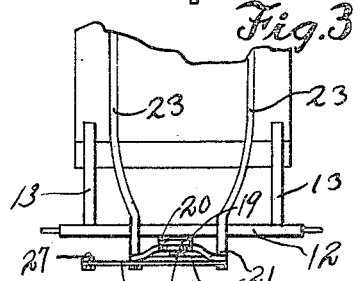
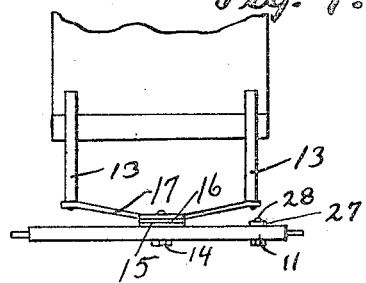
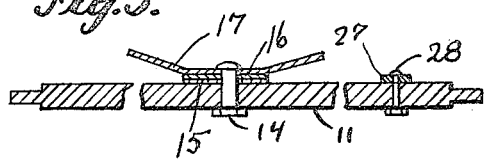
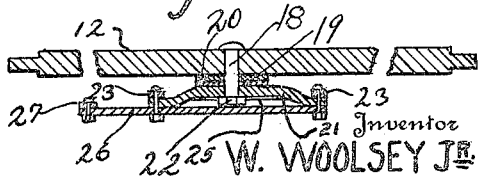
Inventor
W. WOOLSEY Jr.
Witnesses
By
Attorneys

UNITED STATES PATENT OFFICE.

WILLIAM WOOLSEY, JR., OF LYNBROOK, NEW YORK.

STEERING MECHANISM FOR BABY-CARRIAGES.

1,258,971.  Specification of Letters Patent.  Patented Mar. 12, 1918.

Application filed April 25, 1917. Serial No. 164,473.

*To all whom it may concern:*

Be it known that I, WILLIAM WOOLSEY, Jr., a citizen of the United States, residing at Lynbrook, in the county of Nassau, State of New York, have invented certain new and useful Improvements in Steering Mechanism for Baby-Carriages; and I do hereby declare the following to be a full, clear, and exact description of the invention, such as will enable others skilled in the art to which it appertains to make and use the same.

This invention is an improvement in running gear for vehicles and has particular reference to a steering mechanism for baby carriages and the like.

An object is to provide an improved mechanism utilized to overcome the necessity of lifting the weight of the body of the carriage from the front wheels thereof when desiring to turn the same, and to this end, the end of the carriage is pivotally mounted relative to the rear axle and connected to the front axle so that when said handle is shifted the front axle will be turned about a pivot and thus guide the vehicle.

Another object is to provide a device of this character which is simple in construction, easy to manufacture and effective in carrying out the purpose for which it is designed.

The inventive idea involved is capable of receiving a variety of mechanical expressions, one of which, for the purpose of illustrating the invention, is shown in the accompanying drawing, wherein:—

Figure 1 is a side elevation of a baby carriage with the wheels removed and showing the invention applied thereto.

Fig. 2 is a bottom plan view thereof.

Fig. 3 is a rear elevation.

Fig. 4 is a front elevation.

Fig. 5 is a longitudinal section taken through the front axle.

Fig. 6 is a similar section taken through the rear axle.

Referring more particularly to the accompanying drawing the numeral 10 indicates the body of a baby carriage and 11 and 12 the front and rear axles thereof, said body being supported above said axles by the usual springs 13. The front axle 11 is pivotally mounted upon the bolt 14 and has secured thereto and also mounted upon said bolt a plate 15, the latter having resting thereon a similar plate 16 carried by a bracket 17 to which the springs 13 are secured. It will thus be seen that the front axle 11 is supported by the springs 13 through the intermediary of the bracket 17.

The rear axle 12 is likewise provided with a pivot bolt 18 having mounted thereupon a plate 19 secured to the under side of the axle and engaged by a similar plate 20 secured to a bracket 21 which is held in place upon the bolt 18 by means of a nut 22. The arms 23 of the handle 24 are bent downwardly and are secured, adjacent their lower ends, to the ends of the bracket 21, said lower ends of the arms 23 being extended forwardly of the rear axle and connected at their extremities by a link 25. The lower extremity of one arm 23 has connected thereto one end of a diagonally extending bar 26 secured intermediate its ends at the point where the opposite arm 23 is connected to the bracket 21. The other extremity of the bar 26 has pivotally connected thereto one end of a front axle operating arm 27, the forward end of which is pivotally connected at 28 to said front axle 11.

The rearwardly diverging braces 29 are pivotally connected to a bracket 30 secured to the under side of the body 10 adjacent the rear end thereof and said braces have their rearmost ends connected to the arms 23, the pivot of the said braces 29 being in vertical alinement with the pivot bolt 18 mounted in the rear axle.

It will thus be apparent from the foregoing description that should the handle 24 be shifted to the right the bracket 21 will swing about its pivot and exert a rearward pull upon the bar 26 and consequently a forward push upon the arm 27 whereupon the front axle 11 will be swung about its pivot to cause the vehicle to turn to the left. The movement of the parts is reversed when the handle 29 is shifted to the left.

What is claimed is:—

1. In a wheeled vehicle, the combination with a vehicle body, and front and rear axles therefor; of vehicle springs secured to said body and to the rear axle, a bracket secured to said springs and to which the front axle is pivotally connected, a bracket pivoted to said rear axle, a handle including arms connected to said second bracket and extending forwardly therefrom, a connection between the forward ends of said arms, a bar secured intermediate its ends to said bracket and at one of its ends to one of said arms, and a second arm pivoted at one end to the other end of said bar and at its other end to said front axle whereby the latter is turned when the arms of the handle are swung in either direction.

2. In a wheeled vehicle, the combination with a vehicle body, and front and rear axles therefor; of vehicle springs secured to said body and to the rear axle, a bracket secured to said springs and to which the front axle is pivotally connected, a handle including arms pivotally connected to said rear axle and extending forwardly therefrom, a connection between the forward ends of said arms, a bar pivoted intermediate its ends to said rear axle and at one of its ends to one of said arms, a second arm connected at one end to the other end of said bar and at its other end to said front axle whereby the latter is turned when the arms of the handle are swung about their pivots, and braces pivoted to said vehicle body and connected to the arms of said handle.

In testimony whereof, I affix my signature in the presence of two witnesses.

WILLIAM WOOLSEY, Jr.

Witnesses:
RAYMOND W. HEGEMAN,
B. FRANK LANGDON.

Copies of this patent may be obtained for five cents each, by addressing the "Commissioner of Patents, Washington, D. C."